(12) United States Patent
Balci et al.

(10) Patent No.: US 9,286,649 B2
(45) Date of Patent: Mar. 15, 2016

(54) CONDITIONAL EXECUTION OF RENDERING COMMANDS BASED ON PER BIN VISIBILITY INFORMATION WITH ADDED INLINE OPERATIONS

(71) Applicant: QUALCOMM Incorporated, San Diego, CA (US)

(72) Inventors: Murat Balci, Orlando, FL (US); Christopher Paul Frascati, Oviedo, FL (US); Avinash Seetharamaiah, Chuluota, FL (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 14/059,076

(22) Filed: Oct. 21, 2013

(65) Prior Publication Data

US 2014/0354661 A1  Dec. 4, 2014

Related U.S. Application Data (60) Provisional application No. 61/829,564, filed on May 31, 2013.

(51) Int. Cl.
*G06T 15/40* (2011.01)
*G06T 1/20* (2006.01)
*G06T 15/00* (2011.01)

(52) U.S. Cl.
CPC .................. *G06T 1/20* (2013.01); *G06T 15/005* (2013.01)

(58) Field of Classification Search
CPC ......... G06T 15/40; G06T 15/405; G06T 1/20; G06T 2200/28
See application file for complete search history.

(56) References Cited

U.S. PATENT DOCUMENTS

| | | | |
|---|---|---|---|
| 6,417,861 B1 | 7/2002 | Deering et al. | |
| 6,525,726 B1 * | 2/2003 | Xie et al. | 345/421 |
| 7,030,877 B1 | 4/2006 | Sell | |
| 7,388,581 B1 | 6/2008 | Diard et al. | |
| 8,179,394 B1 | 5/2012 | Everitt et al. | |
| 2002/0060685 A1 | 5/2002 | Handley et al. | |
| 2013/0120380 A1 | 5/2013 | Kallio et al. | |
| 2013/0135322 A1 | 5/2013 | Seetharamaiah et al. | |

OTHER PUBLICATIONS

International Search Report and Written Opinion from International Application No. PCT/US2014/037851 dated Mar. 25, 2015, 12 pp.
Ribble, "Next-Gen: Tile-Based GPUs," Game developers conference mobile'08, San Francisco, CA, Feb. 18-22, 2008, XP002722660, 36 pp.

* cited by examiner

*Primary Examiner* — Hau Nguyen
(74) *Attorney, Agent, or Firm* — Shumaker & Sieffert, P.A.

(57) ABSTRACT

A GPU may determine, based on a visibility stream, whether to execute instructions stored in an indirect buffer. The instructions include instructions for rendering primitives associated with a bin of a plurality of bins and include one or more secondary operations. The visibility stream indicate if one or more of the primitives associated with the bin will be visible in a finally rendered scene. The GPU may, responsive to determining not to execute the instructions stored in the indirect buffer, execute one or more secondary operations stored in a shadow indirect buffer. The GPU may, responsive to determining to execute the instructions stored in the indirect buffer, execute the instructions for rending the primitives associated with the bin of the plurality of bins and executing the one or more secondary operations stored in the indirect buffer.

28 Claims, 6 Drawing Sheets

CONDITIONAL EXECUTION OF RENDERING COMMANDS BASED ON PER BIN VISIBILITY INFORMATION WITH ADDED INLINE OPERATIONS

This application claims the benefit of U.S. Provisional Application No. 61/829,564, filed May 31, 2013, the entire content of which is hereby incorporated by reference.

TECHNICAL FIELD

This disclosure relates to techniques for graphics processing and more particularly relates to techniques for rendering primitives in graphics processing.

BACKGROUND

Visual content for display, such as content for graphical user interfaces and video games, may be generated by a graphics processing unit (GPU). A GPU may convert two-dimensional (2D) or three-dimensional (3D) graphical objects into a 2D pixel representation that may be displayed on a display device. Converting information about 3D objects into a 2D pixel representation that can be displayed is known as pixel rendering, and may require considerable memory and processing power.

SUMMARY

In general, this disclosure describes techniques for conditional execution of rendering instructions for bin-based rendering based on per-bin visibility information. By executing rendering instructions of a bin if, and in some examples, only if, the primitives in the bin are visible, a graphics processing unit (GPU) can improve its performance in rendering graphical objects and scenes that comprise primitives. The GPU may determine if the primitives in a bin are visible in the rendered graphical object or scene based on a visibility stream for the bin that indicates if any primitives in the bin are visible.

In one aspect, the disclosure is directed to a method for rendering a scene. The method includes determining based on a visibility stream, whether to execute instructions stored in an indirect buffer, wherein the instructions stored in the indirect buffer include instructions for rendering primitives associated with a bin of a plurality of bins and further include one or more secondary operations, and wherein the visibility stream indicates if the bin is associated with at least one primitive that will be visible in a finally rendered scene. The method further includes responsive to determining, based on the visibility stream, not to execute the instructions stored in the indirect buffer, executing one or more operations stored in a shadow indirect buffer, wherein the one or more operations stored in the shadow indirect buffer includes the one or more secondary operations. The method further includes responsive to determining, based on the visibility stream, to execute the instructions stored in the indirect buffer, executing the instructions stored in the indirect buffer for rendering the primitives associated with the bin of the plurality of bins and executing the one or more secondary operations stored in the indirect buffer.

In another aspect, the disclosure is directed to a device configured for graphics processing. The device includes a graphics processing unit (GPU) configured to: determine based on a visibility stream, whether to execute instructions stored in an indirect buffer, wherein the instructions stored in the indirect buffer include instructions for rendering primitives associated with a bin of a plurality of bins and further include one or more secondary operations, and wherein the visibility stream indicates if the bin is associated with at least one primitive that will be visible in a finally rendered scene; responsive to determining, based on the visibility stream, not to execute the instructions stored in the indirect buffer, execute one or more operations stored in a shadow indirect buffer, wherein the one or more operations stored in the shadow indirect buffer includes the one or more secondary operations; and responsive to determining, based on the visibility stream, to execute the instructions stored in the indirect buffer, execute the instructions stored in the indirect buffer for rendering the primitives associated with the bin of the plurality of bins and executing the one or more secondary operations stored in the indirect buffer.

In another aspect, the disclosure is directed to a computer-readable storage medium having instructions stored thereon that when executed cause one or more processors to perform operations. The operations include determining based on a visibility stream, whether to execute instructions stored in an indirect buffer, wherein the instructions stored in the indirect buffer include instructions for rendering primitives associated with a bin of a plurality of bins and further include one or more secondary operations, and wherein the visibility stream indicates if the bin is associated with at least one primitive that will be visible in a finally rendered scene. The operations further include responsive to determining, based on the visibility stream, not to execute the instructions stored in the indirect buffer, executing one or more operations stored in a shadow indirect buffer, wherein the one or more operations stored in the shadow indirect buffer includes the one or more secondary operations. The operations further include responsive to determining, based on the visibility stream, to execute the instructions stored in the indirect buffer, executing the instructions stored in the indirect buffer for rendering the primitives associated with the bin of the plurality of bins and executing the one or more secondary operations stored in the indirect buffer.

In another aspect, the disclosure is directed to a device. The device includes means for determining based on a visibility stream, whether to execute instructions stored in an indirect buffer, wherein the instructions stored in the indirect buffer include instructions for rendering primitives associated with a bin of a plurality of bins and further include one or more secondary operations, and wherein the visibility stream indicates if the bin is associated with at least one primitive that will be visible in a finally rendered scene. The device further includes responsive to determining, based on the visibility stream, not to execute the instructions stored in the indirect buffer, means for executing one or more operations stored in a shadow indirect buffer, wherein the one or more operations stored in the shadow indirect buffer includes the one or more secondary operations. The device further includes responsive to determining, based on the visibility stream, to execute the instructions stored in the indirect buffer, means for executing the instructions stored in the indirect buffer for rendering the primitives associated with the bin of the plurality of bins and executing the one or more secondary operations stored in the indirect buffer.

DETAILED DESCRIPTION

A graphics processing unit (GPU) is often used to render a three dimensional scene. Because such rendering of three dimensional (3D) scenes can be very memory bandwidth-intensive, a specialized graphics memory (GMEM) is located close to the graphics processing core of the GPU so that it has a very high memory bandwidth. A scene can be rendered by the graphics processing core of the GPU to the GMEM, and the scene can be resolved from GMEM to memory (e.g., a frame buffer) so that the scene can then be displayed at a display device. However, because the size of the GMEM may be limited due to physical area constraints, the GMEM may not have sufficient memory capacity to contain an entire three dimensional scene. Instead, a three dimensional scene may need to be split into tiles, so that each tile making up the scene can fit into GMEM. For example, if the GMEM is able to store 512 kB of data, then the scene may be divided into tiles such that the pixel data contained in each tile is less than or equal to 512 kB. In this way, the scene can be rendered by dividing up the scene into tiles that can be rendered into the GMEM and individually rendering each tile of the scene into the GMEM, storing the rendered tile from GMEM to a frame buffer, and repeating the rendering and storing for each tile of the scene. Accordingly, the scene can be rendered tile-by-tile using multiple rendering passes to render each tile of the scene.

A scene can be made up of primitives, such as triangles, and each of the tiles making up the scene may include one or more of the primitives. The tiles making up a scene can each be associated with a bin in memory that stores the primitives included in each respective tile. Rendering a tile of the scene into the GMEM may include executing commands to render the primitives in the associated bin into the GMEM. A binning pass, of the GPU, can sort the primitives making up a scene into the appropriate bins. The binning pass, of the GPU, may also create visibility streams for each bin that indicates whether or not any primitives in the bin will be visible in the final rendered scene.

The commands to render the primitives in a bin are loaded in an indirect buffer, and the GPU executes the commands stored in the indirect buffer to render the primitives included in the bin. If the visibility stream for a bin indicates that the bin does not contain any visible primitives (i.e., all of the primitives in the bin will not be visible in the final rendered scene), performance may be improved if the GPU does not render the primitives in the bin by skipping execution of the instructions in the indirect buffer associated with the bin.

However, in addition to storing the command stream to render the primitives in a particular bin, many modern graphics applications or compositing systems use the indirect buffer to store secondary commands. These secondary commands may be commands that are unrelated to the rendering of primitives for the particular bin. For example, the secondary commands may include inline operations (e.g., fast clears that clear multiple areas, inline/tileable blits that transfer image block from one portion of the scene to another, and other bit-block transfers) and other state updates. While the inline operations and other state updates may not contribute to the visibility stream by design, they may contribute to the resulting rendering of the scene. Thus, if the GPU does not execute those instructions in the indirect buffer associated with the bin because the visibility stream for the bin indicates that there are no visible primitives associated with the bin, the secondary commands in the indirect buffer are also not executed, thereby resulting in corruption of the final scene.

To ensure that the GPU executes the secondary commands included in an indirect buffer even if the GPU, based on the visibility stream for a bin, determines that the bin does not include any primitives that will be visible in the final rendered scene, the GPU (and/or the graphics driver) can allocate a shadow indirect buffer in memory (e.g., system memory), store the secondary commands from the indirect buffer for the bin to the shadow indirect buffer, and the GPU may execute the secondary commands stored in the shadow indirect buffer. When no primitives are visible for a given bin, the GPU can conditionally not execute commands to render the primitive (e.g., the draw commands) stored in the original rendering indirect buffer and may instead execute the secondary commands (e.g., inline operations and state updates) in the shadow indirect buffer. In this way, the GPU can still execute the secondary commands stored together in the same indirect buffer as the command stream of a particular bin even if none of the primitives of that bin will be visible in the final rendered scene.

The shadow indirect buffer is a subset of the corresponding indirect buffer for the bin in that it may in some examples only include the secondary commands of the corresponding indirect buffer. In some examples, the GPU can allocate a shadow indirect buffer in memory, and each bin that includes one or more secondary commands other than instructions for rendering primitives may store the one or more secondary commands in the shadow indirect buffer. The shadow indirect buffer can be populated by the GPU with secondary commands of a bin at the same time as the indirect buffer is populated with instructions for rendering primitives of that bin. In other examples, a shadow indirect buffer may store secondary commands of a bin if the GPU determines, based on the visibility stream, that the corresponding bin does not include any primitives that will be visible in the finally rendered scene.

Any tile-based rendering GPU that stores both inline operations and commands for rendering primitives in the same bin can conditionally execute instructions in a shadow indirect buffer instead of instructions in a corresponding indirect buffer based on the visibility stream associated with the corresponding bin. By skipping parsing and execution of indirect buffers that do not include commands for rendering any visible primitives while still executing inline operations in the shadow indirect buffer, the rendering performance of the GPU can be improved without affecting the final rendered scene.

Figure 1:
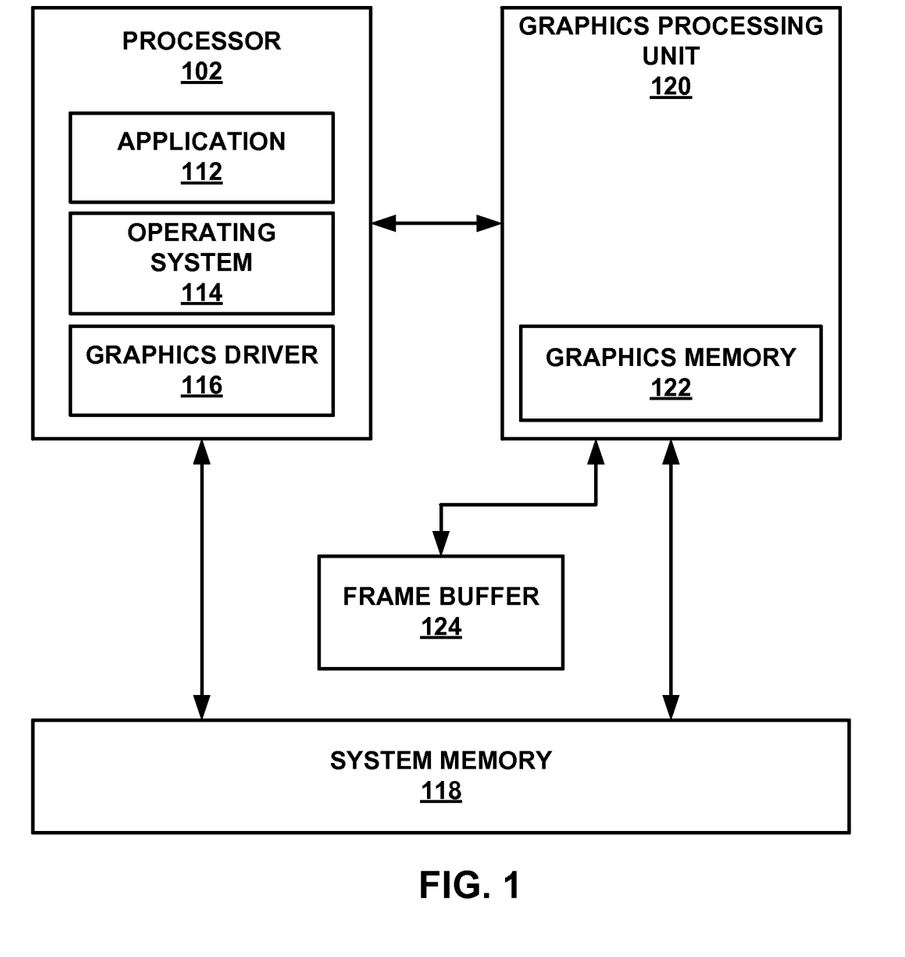
FIG. 1 is a block diagram illustrating a processor, a graphics processing unit, and a system memory used to render three dimensional scenes according to some aspects of the present disclosure.

FIG. 1 is a block diagram illustrating a processor, a graphics processing unit, and a system memory used to render a three dimensional scene according to some aspects of the present disclosure. Processor 102 may execute software application 112, operating system 114, and graphics driver 116. System memory 118 may include an indirect buffer and a shadow indirect buffer that store the command streams for rendering primitives as well as secondary commands that are to be executed by GPU 120. GPU 120 may include graphics memory 122. Graphics memory 122 may be the GMEM described above. In some examples, graphics memory 122 may be "on-chip" with GPU 120. In some cases, all hardware elements show in FIG. 1 may be on-chip, for example, in a system on a chip (SoC) design.

In the example of FIG. 1, processor 102, system memory 118, and GPU 120 may be part of a device. Examples of the device include, but are not limited to, video devices, media players, set-top boxes, wireless handsets such as mobile telephones and so-called smartphones, personal digital assistants (PDAs), desktop computers, laptop computers, gaming consoles, video conferencing units, tablet computing devices, and the like.

Processor 102 may be the central processing unit (CPU). GPU 120 may be a processing unit configured to perform graphics related functions such as generate and output graphics data for presentation on a display, as well as perform non-graphics related functions that exploit the massive processing parallelism provided by GPU 120. For example, GPU 120 may execute both graphics applications and non-graphics applications. Because GPU 120 may provide general purpose processing capabilities in addition to graphics processing capabilities, GPU 120 may be referred to as a general purpose GPU (GP-GPU).

Examples of processor 102 and GPU 120 include, but are not limited to, a digital signal processor (DSP), a general purpose microprocessor, application specific integrated circuit (ASIC), field programmable logic array (FPGA), or other equivalent integrated or discrete logic circuitry. In some examples, GPU 120 may be a microprocessor designed for specific usage such as providing massive parallel processing for processing graphics, as well as for executing non-graphics related applications. Furthermore, although processor 102 and GPU 120 are illustrated as separate components, aspects of this disclosure are not so limited. For example, processor 102 and GPU 120 may reside in a common integrated circuit (IC).

Software application 112 that executes on CPU 102 may include one or more graphics rendering instructions that instruct CPU 102 to cause the rendering of graphics data to a display (not shown). In some examples, the graphics rendering instructions may include software instructions that may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 102 may issue one or more graphics rendering commands to GPU 120 (e.g., through graphics driver 116) to cause GPU 120 to perform some or all of the rendering of the graphics data. In some examples, the graphics data to be rendered may include a list of graphics primitives, e.g., points, lines, triangles, quadrilaterals, triangle strips, etc.

GPU 120 may be configured to perform graphics operations to render one or more graphics primitives to a display. Thus, when one of the software applications executing on CPU 102 requires graphics processing, CPU 102 may provide graphics commands and graphics data to GPU 120 for rendering to the display. The graphics data may include, e.g., drawing commands, state information, primitive information, texture information, etc. GPU 120 may, in some instances, be built with a highly-parallel structure that provides more efficient processing of complex graphic-related operations than CPU 102. For example, GPU 120 may include a plurality of processing elements that are configured to operate on multiple vertices or pixels in a parallel manner. The highly parallel nature of GPU 120 may, in some instances, allow GPU 120 to draw graphics images (e.g., GUIs and two-dimensional (2D) and/or three-dimensional (3D) graphics scenes) onto the display more quickly than drawing the scenes directly to the display using CPU 102.

GPU 120 may be directly coupled to graphics memory 122. In other words, GPU 120 may process data locally using a local storage, instead of off-chip memory. This allows GPU 120 to operate in a more efficient manner by eliminating the need of GPU 120 to read and write data via a bus, which may experience heavy bus traffic. In some instances, however, GPU 120 may not include a separate memory, but instead utilize system memory 118. Graphics memory 122 may include one or more volatile or non-volatile memories or storage devices, such as, e.g., random access memory (RAM), static RAM (SRAM), dynamic RAM (DRAM), and one or more registers.

CPU 102 and/or GPU 120 may store rendered image data in a frame buffer 124. Frame buffer 124 may be an independent memory or may be is allocated within system memory 118. A display processor (not shown) may retrieve the rendered image data from frame buffer 124 and display the rendered image data on a display.

System memory 118 is the system memory of the device and resides external to processor 102 and GPU 120, i.e., off-chip with respect to processor 102, and off-chip with respect to GPU 120. System memory 118 may store applications that are executed by processor 102 and GPU 120. Furthermore, system memory 118 may store data upon which the executed applications operate, as well as the data that result from the application. However, not all such data needs to be stored in system memory 118 in every example. In some instances, the data may be stored locally on processor 102 or GPU 120. For example, some or all of the data may be stored locally within on-chip GPU memory (e.g., graphics memory 122).

System memory 118 may store program modules and/or instructions that are accessible for execution by CPU 102 and/or data for use by the programs executing on CPU 102. For example, system memory 118 may store a window manager application that is used by CPU 102 to present a graphical user interface (GUI) on a display. In addition, system memory 118 may store user applications and application surface data associated with the applications. System memory 118 may act as a device memory for GPU 120 and may store data to be operated on by GPU 120 as well as data resulting from operations performed by GPU 120. For example, system memory 118 may store any combination of texture buffers, depth buffers, stencil buffers, vertex buffers, frame buffers, or the like.

System memory 118 may be an example of a computer-readable storage medium. For example, system memory 118 may store instructions that cause processor 102 and GPU 120 to perform functions ascribed to each in this disclosure. System memory 118 may be considered as a computer-readable storage medium comprising instructions that cause one or more processors (e.g., processor 102 or GPU 120) to perform various functions.

Examples of system memory 118 include, but are not limited to, a random access memory (RAM), a read only memory (ROM), or an electrically erasable programmable read-only memory (EEPROM), or any other medium that can be used to carry or store desired program code in the form of instructions or data structures and that can be accessed by a computer or a processor. As one example, system memory 118 may be removed from the device, and moved to another device. As another example, a storage device, substantially similar to system memory 118, may be inserted into the device.

In accordance with techniques of the present disclosure, CPU 102 may issue one or more graphics rendering commands to GPU 120 to render a graphical scene made up of primitives. GPU 120 may perform a binning pass to sort the primitives making up the graphical scene into a plurality of bins so that each bin of primitives may, when rendered, fit entirely into graphics memory 122. GPU 120, when performing the binning pass, may also create a visibility stream for each bin in the plurality of bins. The visibility stream associated with a bin may indicate if the bin is associated with at least one primitive that will be visible in the finally rendered scene.

Each bin in the plurality of bins may be associated with instructions for rendering the primitives in the associated bin. For each of the plurality of bins, the associated instructions may, in turn bin-by-bin, be stored in an indirect buffer in memory 118. The associated instructions for a bin stored into the indirect buffer may include the associated instructions as well as secondary instructions. Secondary instructions may be instructions that are unrelated to the rendering of the primitives in the bin. However, the secondary instructions may, in some instances, be image-related operations. Secondary instructions may include inline operations such as fast clears that clear pixels from multiple areas of a scene, inline/tileable blits that transfer image block (e.g., groups of pixels) from one portion of the scene to another, and other bit-block transfers, as well as other state updates. If the indirect buffer includes one or more secondary instructions for a bin, the same one or more secondary instructions for the bin may be stored in a shadow indirect buffer in memory 118. In some examples, the secondary instructions are associated with the bin because the secondary instructions operate within the tile associated with the bin. For example, the associated tile may include pixels other than primitives, and one of the areas of the scene cleared by a fast clear secondary operation may include at least a portion of the associated tile. In another example, the tileable blit secondary operation may transfer an image block from the associated tile or to the associated tile.

GPU 120 may render the graphical scene by rendering, bin-by-bin, the primitives making up the graphical scene. GPU 120 may determine for each bin, based on the visibility stream for the bin, whether to execute instructions of the bin stored in the indirect buffer or whether to execute the instructions of the bin stored in a shadow indirect buffer. The instructions stored in the indirect buffer may include instructions for rendering primitives associated with the bin of the plurality of bins. The instructions stored in the indirect buffer may further include one or more secondary operations. As discussed above, the secondary operations may be operations unrelated to the rendering of primitives for the bin. Responsive to determining, based on the visibility stream, not to execute the instructions stored in the indirect buffer, GPU 120 may execute the instructions for the bin stored in the shadow indirect buffer, wherein the instructions stored in the shadow indirect buffer include the one or more secondary instructions. Alternatively, responsive to determining, based on the visibility stream, to execute the instructions stored in the indirect buffer, GPU 120 may execute the instructions for the bin stored in the indirect buffer for rendering the primitives associated with the bin of the plurality of bins and also executing the one or more secondary operations stored in the indirect buffer.

Figure 2:
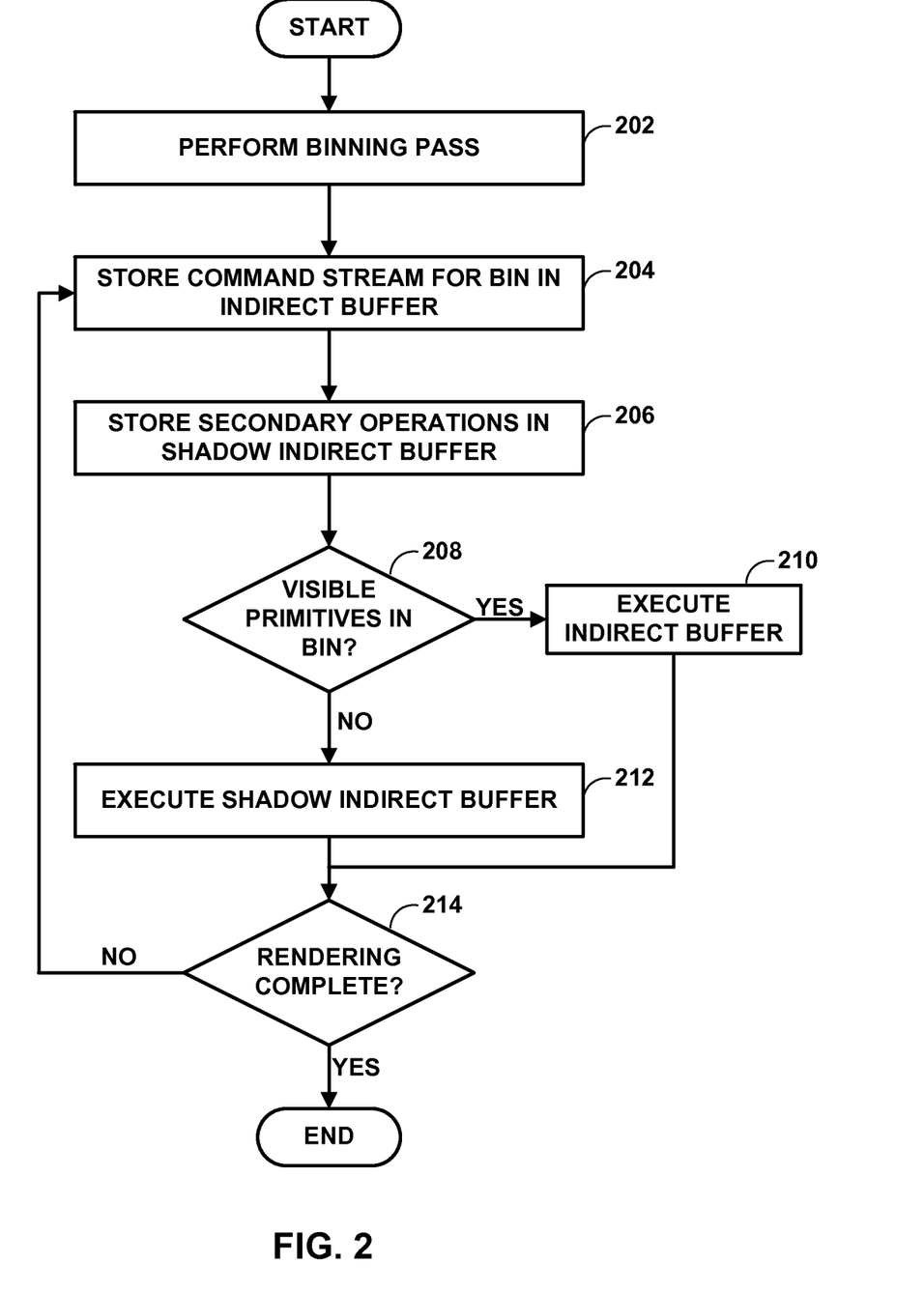
FIG. 2 a conceptual diagram illustrating tiles of a scene in a tile-based rendering architecture according to some aspects of the present disclosure.

FIG. 2 is a flowchart illustrating a process for rendering a graphical scene using a tile-based GPU according to some aspects of the present disclosure. As shown in FIG. 2, GPU 120 that renders a graphical scene may perform a binning pass to determine the primitives contained in each bin of a scene (202). A bin may represent a tile out of the plurality of tiles of the scene, and the primitives contained in a bin may also be included in the tile represented by the bin. Besides using the binning pass to determine the primitives contained in each bin, GPU 120 may also use the binning pass to generate a visibility stream that indicates whether or not specific primitives in the bin are actually visible in the final rendered scene. For example, some primitives may be behind another primitive in the scene and will not be visible in some scenarios (e.g., when the primitive in front is opaque or when no blending is used). More specifically, a primitive may not be visible in the final rendered scene in a particular bin if the primitive is backface-culled, if the primitive does not hit the bin area, or if the primitive is occluded by a depth test, such as a low-resolution Z check. Performing a binning pass may include executing commands that cause GPU 120 to perform a simplified version of a graphics pipeline, but with the additional step of updating a visibility stream for each primitive in the bin based on a depth test (Z test) that determines whether or not the primitive is visible in the final rendered scene.

The goal of the binning pass is to identify primitives that intersect the current bin. As such, only the position of the vertices of the primitive may need to be determined to identify if a primitive intersects a particular bin. The binning pass may operate by using a simplified vertex shader in GPU 120's graphics pipeline that only includes instructions that affect the position of the vertices. For example, color instructions, texture coordinates and other instructions that do not affect the position of primitive vertex may be removed from the simplified vertex shader used for the binning pass. The binning pass also uses coarse rasterization, rather than fine rasterization, to determine an approximate depth of each primitive. Coarse rasterization calculates a depth value at a lower precision (e.g., using a lower number of bits) than fine rasterization. Only approximate depth values are necessary to determine if a primitive is visible in the bin. In some examples, pixel shaders are not used in the binning pass.

In some examples, the generated visibility stream may include a bit for each primitive in the bin that indicates if the primitive is visible in the final rendered scene, so that the visibility stream may be a string of bits that indicates whether or not a specific primitive in the rendered bin is visible (e.g., 1 indicates a primitive is visible, 0 indicates a primitive is not visible). If the bit corresponding to a primitive in a bin is on, it may indicate that the corresponding primitive is visible in the final rendered scene. In contrast, if the bit corresponding to a primitive in a bin is off, it may indicate that the corresponding primitive is not visible in the final rendered scene. In some examples, GPU 120 may compress the visibility streams, resulting in less memory consumption and faster skipping of non-visible primitives during the rendering of the scene.

GPU 120 renders the graphical scene by executing the command stream of each bin to render the primitives in each of the bins onto graphics memory. GPU 120 may further store the command stream for rendering the primitives of a bin in an indirect buffer (204). The command stream stored into the indirect buffer may include a series of state commands and draw commands for drawing the primitives of the particular bin. The state commands may affect the behavior of the graphics processing pipeline executed by GPU 120. For example, state commands may change the color, polygon mode (e.g., points instead of solids or lines), blending (on/ off), depth testing (on/off), texturing (on/off), culling, clipping, and other logical operations.

The command stream stored into the indirect buffer may also include secondary commands supported by many modern graphics applications or compositing systems such as Microsoft Desktop Window Manager. These secondary commands may be unrelated to the rendering of primitives for the particular bin. For example, the secondary commands may include inline operations (e.g., fast clears that clear multiple areas, inline/tileable blits that transfer image block from one portion of the scene to another, and other bit-block transfers) and other state updates. While the inline operations and other state updates may not contribute to the visibility stream by design, they may contribute to the resulting rendering of the scene.

If the visibility stream for a bin indicates that the bin does not contain any visible primitives (i.e., all of the primitives in the bin will not be visible in the final rendered scene), performance may be improved if GPU 120 does not render the primitives in the bin by skipping execution of the instructions in the indirect buffer associated with the bin. However, as discussed above, besides storing the command stream to render the primitives in a particular bin, the indirect buffer may also include secondary commands, such as inline operations, and state updates. While the inline operations and state updates may not contribute to the visibility stream by design, they may contribute to the resulting rendering of the scene. Thus, if GPU 120 does not execute those instructions in the indirect buffer associated with the bin because the visibility stream for the bin indicates that there are no visible primitives associated with the bin, the secondary commands in the indirect buffer are also not executed, thereby resulting in corruption of the final scene.

To ensure that GPU 120 executes the secondary commands included in an indirect buffer even if GPU 120, based on the visibility stream for a bin, determines that the bin does not include any primitives that will be visible in the final rendered scene, GPU 120 (and/or graphics driver 116) can store the state updates and secondary commands from the indirect buffer for the bin to a shadow indirect buffer allocated in memory (e.g., system memory 118) (206). If no primitives are visible for a given bin, GPU 120 can conditionally determine to not execute the more complicated original rendering indirect buffer and instead may just execute the shadow inline rendering indirect buffer if there are secondary commands for the given bin in the shadow indirect buffer. In this way, GPU 120 can still execute the secondary commands stored together in the same indirect buffer as the command stream of a particular bin even if none of the primitives of that bin will be visible in the final rendered scene. In some examples, GPU 120 may store the state updates and secondary commands from the indirect buffer to the shadow indirect buffer in response to determining, based on the visibility stream for the bin, if the bin includes primitives that will be visible in the finally rendered scene.

The shadow indirect buffer includes a subset of the commands and operations stored in the corresponding indirect buffer for the bin. In some examples the shadow indirect buffer includes only the secondary commands of the corresponding indirect buffer. In some examples, the one or more secondary commands are commands other than instructions for rendering primitives. GPU 120 can populate the shadow indirect buffer with secondary commands for a bin at the same time as GPU 120 populates the corresponding indirect buffer with instructions for the bin for rendering primitives. In other examples, GPU 120 may populate the shadow indirect buffer with the secondary commands of a bin if GPU 120 determines, based on the visibility stream, that the corresponding bin does not include any primitives that will be visible in the finally rendered scene.

The loading of secondary commands into the shadow indirect buffer and the conditional execution of instructions in the shadow indirect buffer in lieu of instructions in a corresponding indirect buffer may be implemented by any tile-based rendering GPU, such as GPU 120, that executes inline operations along with commands for rendering primitives in a bin. For example, graphics driver 116 may include a conditional_ib2_X_else_Y packet, where X is rendering pass for the indirect buffer and Y is the shadow indirect buffer containing inline instructions. In some examples, such a conditional packet can be implemented in hardware, such as the hardware of GPU 120. By skipping parsing and execution of the indirect buffer if it does not include commands for rendering any visible primitives while still executing inline operations in the shadow indirect buffer, GPU 120's rendering performance can improved.

GPU 120 may determine, based on the visibility stream for a bin, whether to execute instructions included in the indirect buffer, including determining, based on the visibility stream for the bin, if the bin includes one or more primitives that will be visible in the finally rendered scene (208). As discussed above, each bin may be associated with a visibility stream, and a visibility stream may include a bit that is switched on (e.g., set to 1) for each primitive in the bin that is visible in the final rendered scene. If the visibility stream for the bin includes one or more bits that are switched on, then GPU 120 may determine that the bin includes one or more primitives that will be visible in the finally rendered scene. In contrast, if the visibility stream for the bin does not include any bits that are switched on, then GPU 120 may determine that the bin does not include one or more primitives that will be visible in the finally rendered scene.

Responsive to determining, based on the visibility stream, to execute the instructions in the indirect buffer, including responsive to determining, based on the visibility stream, that the bin does include one or more primitives that will be visible in the finally rendered scene, GPU 120 may execute the instructions stored in the indirect buffer (210). GPU 120 may execute the instructions for drawing primitives for the bin as well as the one or more secondary operations included in the bin.

Responsive to determining, based on the visibility stream, not to execute the instructions in the indirect buffer, including responsive to determining, based on the visibility stream, that the bin does not include one or more primitives that will be visible in the finally rendered scene, GPU 120 may instead execute the instructions stored in the shadow indirect buffer (212). GPU 120 may execute the one or more secondary operations included in the shadow indirect buffer.

GPU 120 may determine whether it has finished rendering the scene (214). If GPU 120 determines that there are additional tiles of the scene that it has yet to render, GPU 120 may move on and render the next tile of the scene by storing the command stream for the bin associated with the next tile of the scene into the indirect buffer and may store secondary commands for the bin into the shadow indirect buffer (204).

Figure 3:
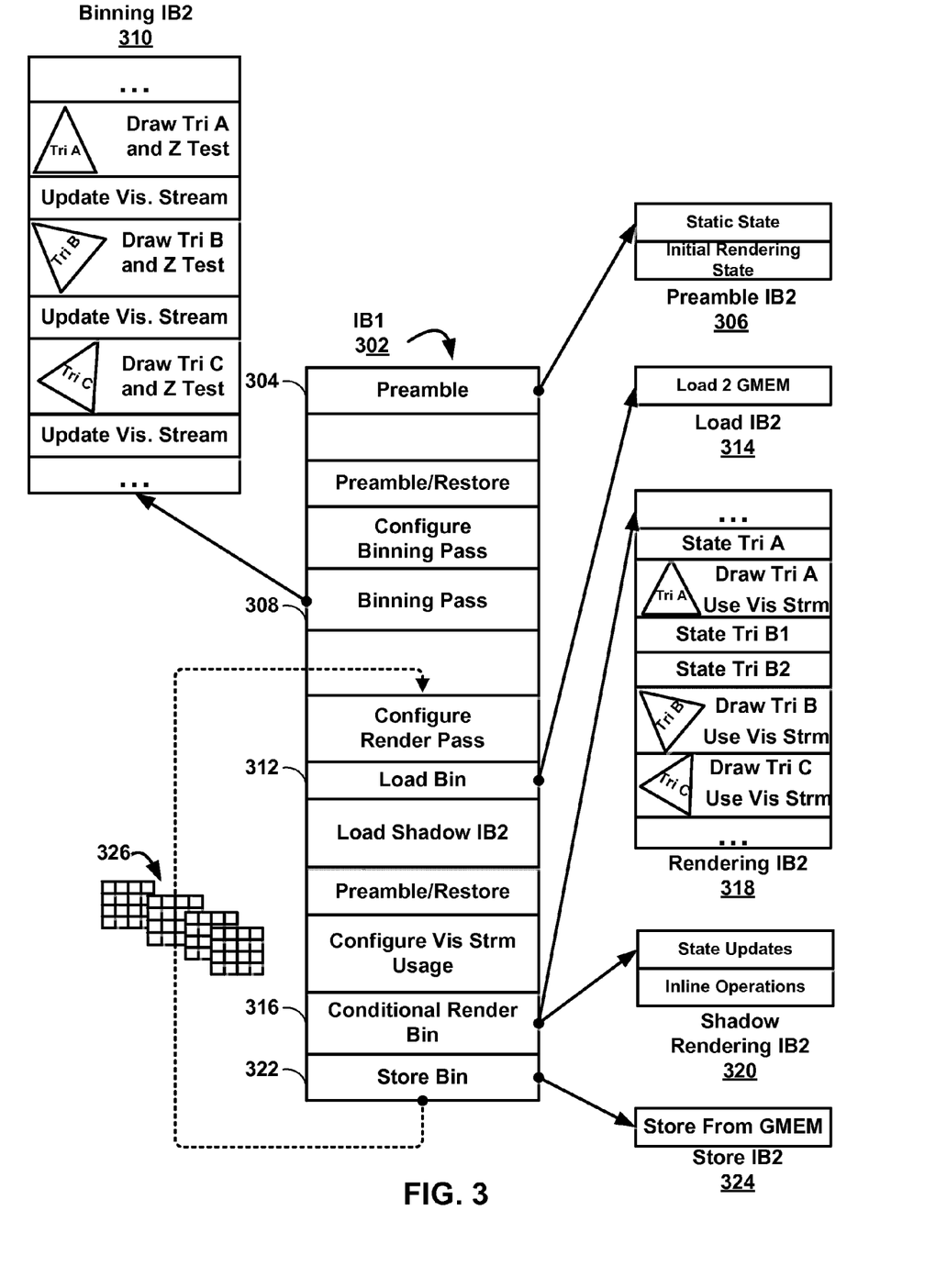
FIG. 3 is a conceptual diagram showing primitives divided amongst bins according to aspects of the present disclosure.

FIG. 3 is a conceptual diagram illustrating command buffers for binning and rendering in a tile-based rendering architecture according to some aspects of the present disclosure. As shown in FIG. 3, level 1 indirect buffer (IB1) 302 may include a series of execution commands for directing GPU 120 to perform the various steps of a graphics memory pipeline for GPU 120. The series of commands stored in IB1 302 include a series of pointers that points to one or more level 2 indirect buffers (IB2s) and directs GPU 120 to perform the commands stored in the IB2s pointed to by the series of pointers in IB1 302. In this way, a two or more level structure is established for executing the graphics memory pipeline for GPU 120. GPU 120 may sequentially step through each execution command in IB1 302, where each execution in IB1 302 points to a specific stack of commands stored in an IB2. In some examples IB2s described herein may include indirect buffers and shadow indirect buffers discussed above. In some examples IB1 302 and IB2s may be stored in system memory 118. In other examples, IB1 302 and IB2s may be stored in memory on GPU 120.

Preamble instruction 304 in IB1 302 may point to preamble IB2 306 that includes instructions for establishing the static state of GPU 120 and sets the initial rendering state of GPU 120. The static state of GPU 120 includes settings that do not change based on the particular application. The rendering state, on the other hand, includes GPU settings that may change based on the particular application (e.g., an OpenGL application vs. a Direct X application). For example, the instructions may establish that GPU 120 will perform a binning pass for primitives of the 3D object to be rendered. After the commands in the preamble IB2 306 are completed, control returns to IB1 302 to perform the next execution command.

The next execution command in IB1 302 may be binning pass instruction 308. Binning pass instruction 308 in IB1 302 may point to binning IB2 310 that includes instructions for performing a binning pass, as described above with respect to FIG. 2.

IB1 302 may also include instructions for GPU 120 to perform a rendering pass to render the primitives of the 3D object. Load bin instruction 312 in IB1 302 may point to load IB2 314 that includes instructions for loading data for a particular bin into graphics memory. Conditional render bin instruction 316 may point to rendering IB2 318 that includes a series of state commands and draw commands for drawing the primitives of the particular bin having data loaded into the graphics memory as well as shadow rendering IB2 320 that include inline operations and state updates. If the visibility stream for the bin indicates that there are one or more visible primitives in the bin, GPU 120 may execute the instructions in rendering IB2 318. As shown in rendering IB2 318, state commands may be issued on a per triangle (or per primitive) basis. That is, the command "State Tri A" may affect the behavior of GPU 120 when drawing triangle A, while the "State Tri B1" and "State Tri B2" commands may affect the behavior of GPU 120 when drawing triangle B. The "State Tri B1" and "State Tri B2" commands merely indicate that multiple state commands may be executed for each triangle. On the other hand, if the visibility stream for the bin indicates that the bin includes no visible triangles, then GPU 120 may execute the state updates and inline operations stored in shadow rendering IB2.

Store bin instruction 322 may point to store IB2 324 that includes commands to store the rendered bin from GMEM into memory, such as a frame buffer. The rendering pass may be repeated for each of the remaining bins associated with tiles 326 that make up the scene.

Figure 4:
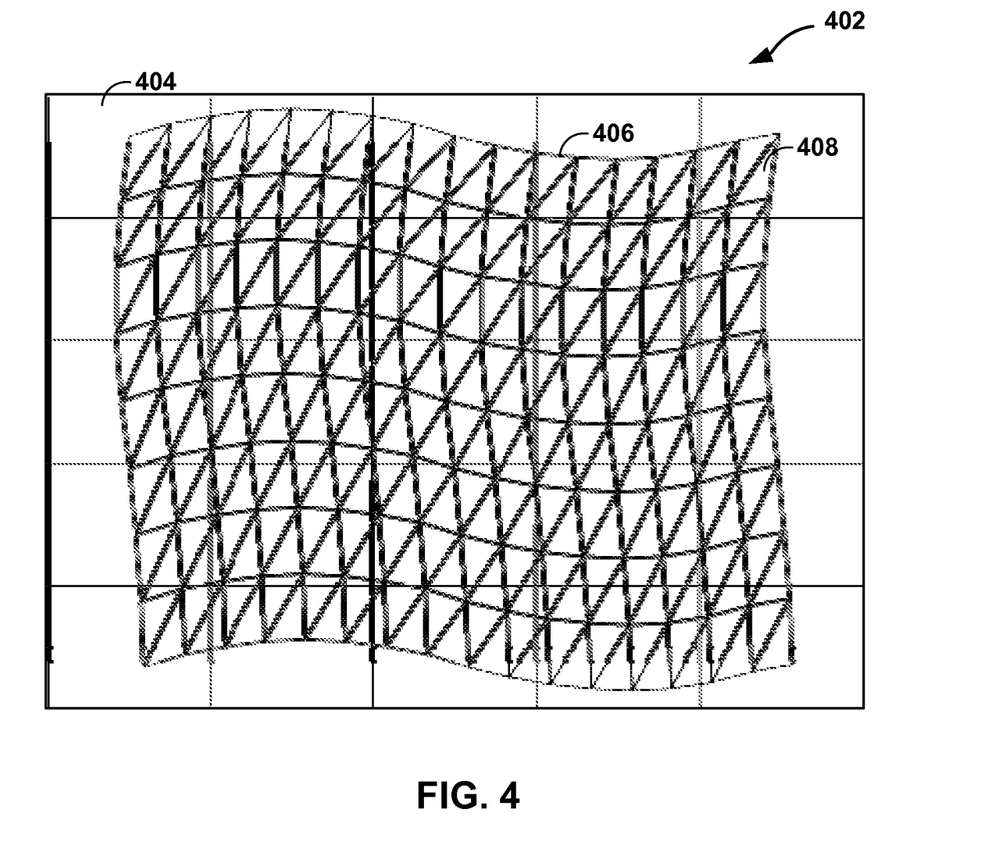
FIG. 4 is a flowchart illustrating a process for rendering a graphical scene using a tile-based GPU according to some aspects of the present disclosure.

FIG. 4 a conceptual diagram illustrating tiles of a scene in a tile-based rendering architecture. As shown in FIG. 4, a CPU, such as processor 102 shown in FIG. 1 may send graphics rendering commands via a graphics driver, such as graphics driver 116 shown in FIG. 1, to a GPU, such as GPU 120 shown in FIG. 1, to render a 3D graphical object 406. Object 206 may be made up of primitives, such as a primitive 408. In the example shown in FIG. 4, the primitives may be triangles that include three vertices. In other examples, the primitives may be points, lines, and the like. A GPU may divide scene 402 containing graphical object 406 into tiles, such as a tile 404. The GPU may determine the size of each tile, such as tile 404, of scene 402 based at least in part on the size of the graphics memory. For example, each tile of scene 402 may be sized so that the portion of the scene 402 contained in a tile may be entirely rendered in the graphics memory, such as graphics memory 122 shown in FIG. 1. Each tile of scene 402 may be considered to be a bin that includes the triangles in that tile. In one example, the width and height of the bin may be aligned by 32 pixels. Because scene 402 is divided into a 5×5 grid of tiles, there are a total of 25 tiles for scene 402 shown in FIG. 4.

GPU 120 may render a triangle by executing a command for rendering the triangle. Thus, GPU 120 may render graphical object 406 by executing commands for rendering each of the triangles making up graphical object 406. GPU 120 may sort the triangles of a scene into bins, so that each bin may include a command stream (a set of commands) to render the triangles included in the bin. Because there are a total of 25 tiles for scene 402, there may be 25 corresponding bins for scene 402. GPU 120 may store the command stream for each bin in an indirect buffer in memory, such as system memory 118 shown in FIG. 1. GPU 120 renders the graphical object 406 by executing the command stream of each bin to render the triangles in each of the bins onto graphics memory 122. After GPU 120 renders the portion of scene 402 contained in a bin onto graphics memory 122, that rendered portion of scene 402 is loaded from graphics memory 122 to a memory, such as frame buffer 124 shown in FIG. 1. GPU 120 may repeat the process of executing the command stream, rendering the trianges of the bin onto graphics memory 122, and loading the rendered portion of the scene 402 from graphics memory 122 to a frame buffer 124 for each bin to render the entire scene 402.

Figure 5:
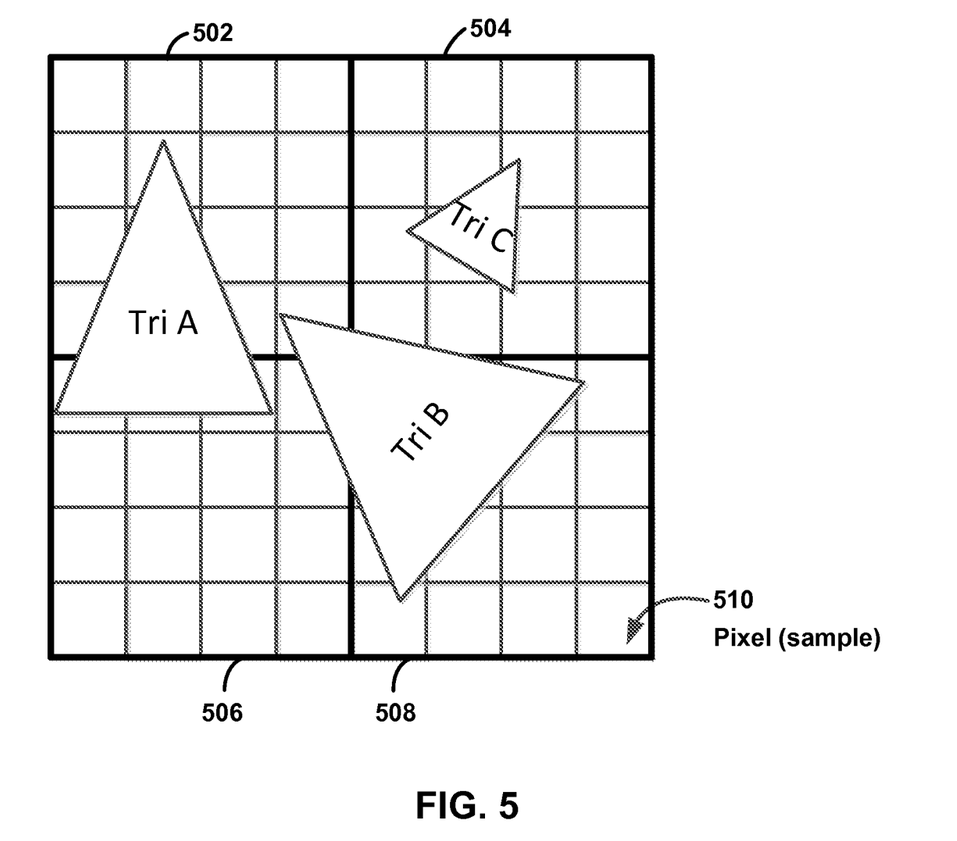
FIG. 5 is a conceptual diagram illustrating command buffers for binning and rendering according to some aspects of the present disclosure.

FIG. 5 is a conceptual diagram showing primitives divided amongst bins according to aspects of the present disclosure. As shown in FIG. 5, bins 502, 504, 506 and 508 that each contains a 4×4 grid of pixels are rendered/rasterized to contain multiple pixels 510. One or more graphics primitives may be visible in each bin. For example, portions of triangle A (Tri A) are visible in both bin 502 and bin 506. Portions of triangle B (Tri B) are visible in each of bin 502, bin 504, bin 506, and bin 508. Triangle C (Tri C) is only visible in bin 504. During a rendering pass, GPU 120 may split a scene into bins and may assign triangles to the bins. If the triangle is visible in more than one bin, GPU 120 may assign the triangle to just one of the bins in which the triangle is visible, so that the triangle is not rendered multiple times as each of the bins 502, 504, 506, and 508 are rendered.

GPU 120 may also determine which triangles in the bin are actually visible in the final rendered scene by performing a binning pass. For example, some triangles may be behind one or more other triangles and will not be visible in the final rendered scene. In this way, triangles that are not visible need not be rendered for that bin.

GPU 120 may determine which triangles intersect each bin by, for each bin, identifying primitives that intersect that bin, including determining the position of the vertices of the primitives. GPU 120 may determine the position of the vertices by using a simplified vertex shader in its graphical pipeline that only includes instructions that affect the position of the vertices. For example, color instructions, texture coordinates and other instructions that do not affect the position of primitive vertex may be removed from the simplified vertex shader. GPU 120 may also use coarse rasterization, rather than fine rasterization, to determine an approximate depth of each primitive. Coarse rasterization calculates a depth value at a lower precision (e.g., using a lower number of bits) than fine rasterization. Only approximate depth values may be necessary to determine if a primitive is visible in the bin.

Besides using the binning pass to determine the primitives contained in each bin, GPU 120 may also use the binning pass to generate a visibility stream that indicates whether or not specific primitives in the bin are actually visible in the final rendered scene. For example, some primitives may be behind another primitive in the scene and will not be visible in some scenarios (e.g., when the primitive in front is opaque or when no blending is used). More specifically, a primitive may not be visible in the final rendered scene in a particular bin if the primitive is backface-culled, if the primitive does not hit the bin area, or if the primitive is occluded by a depth test, such as a low-resolution Z check. Performing a binning pass may include executing commands that cause GPU 120 to perform a simplified version of a graphics pipeline, but with the additional step of updating a visibility stream for each primitive in the bin based on a depth test (Z test) and any additional tests that determines whether or not the primitive is visible in the final rendered scene.

While performing a particular rendering pass, the pixel data for the bin associated with that particular rendering pass may be stored in a graphics memory, such as graphics memory 122 shown in FIG. 1 (sometimes called a bin buffer). After performing the rendering pass, GPU 120 may transfer the contents of graphics memory 122 to frame buffer 124. In some cases, the GPU 120 may overwrite a portion of the data in frame buffer 124 with the data stored in graphics memory 122. In other cases, GPU 120 may composite or combine the data in the frame buffer 124 with the data stored in graphics memory 122. After transferring the contents of graphics memory 122 to frame buffer 124, GPU 120 may initialize the graphics memory 122 to default values and begin a subsequent rendering pass with respect to a different bin.

Figure 6:
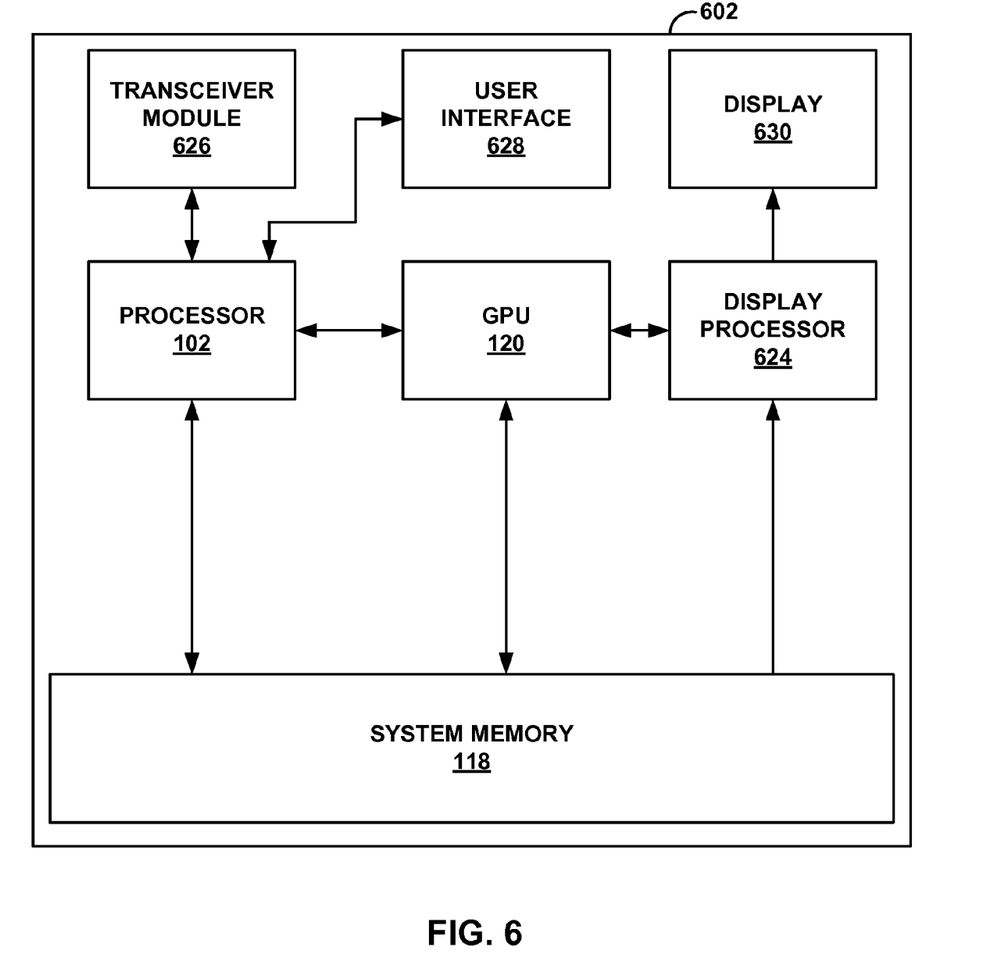
FIG. 6 is a block diagram illustrating an example of a device that may be configured to implement one or more aspects of the present disclosure.

FIG. 6 is a block diagram illustrating an example of a device that may be configured to implement one or more aspects of this disclosure. For example, FIG. 6 illustrates device 602. Examples of the device 602 include, but are not limited to, video devices, media players, set-top boxes, wireless handsets such as mobile telephones and so-called smartphones, personal digital assistants (PDAs), desktop computers, laptop computers, gaming consoles, video conferencing units, tablet computing devices, and the like.

In the example of FIG. 6, device 602 may include processor 102, system memory 118, and GPU 120. For purposes of brevity, processor 102, system memory 118, and GPU 120 are not further described with respect to FIG. 6, as these components have been previously described with respect to FIG. 1. Device 602 may also include display processor 624, transceiver module 626, user interface 628, and display 630. Transceiver module 626 and display processor 624 may both be part of the same integrated circuit (IC) as processor 102 and/or GPU 120, may both be external to the IC or ICs that include processor 102 and/or GPU 120, or may be formed in the IC that is external to the IC that includes processor 102 and/or GPU 120.

Device 602 may include additional modules or units not shown in FIG. 6 for purposes of clarity. For example, device 602 may include a speaker and a microphone, neither of which are shown in FIG. 6, to effectuate telephonic communications in examples where device 602 is a mobile wireless telephone, or a speaker where device 602 is a media player. Device 602 may also include a video camera. Furthermore, the various modules and units shown in device 602 may not be necessary in every example of device 602. For example, user interface 628 and display 630 may be external to device 602 in examples where device 602 is a desktop computer or other device that is equipped to interface with an external user interface or display.

Examples of user interface 628 include, but are not limited to, a trackball, a mouse, a keyboard, and other types of input devices. User interface 628 may also be a touch screen and may be incorporated as a part of display 630. Transceiver module 626 may include circuitry to allow wireless or wired communication between device 602 and another device or a network. Transceiver module 626 may include modulators, demodulators, amplifiers and other such circuitry for wired or wireless communication.

In some examples, GPU 120 may store a fully formed image in system memory 118. Display processor 624 may retrieve the image from system memory 118 and output values that cause the pixels of display 630 to illuminate to display the image. Display 630 may the display of device 602 that displays the image content generated by GPU 120. Display 630 may be a liquid crystal display (LCD), an organic light emitting diode display (OLED), a cathode ray tube (CRT) display, a plasma display, or another type of display device.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method for rendering a scene, the method comprising:
   determining, based at least in part on whether a visibility stream indicates that a bin is associated with primitives that will be visible in a finally rendered scene, whether to execute instructions stored in an indirect buffer, wherein the instructions stored in the indirect buffer include instructions for rendering the primitives associated with the bin of a plurality of bins and further include one or more secondary operations;
   responsive to determining not to execute the instructions stored in the indirect buffer, executing one or more operations stored in a shadow indirect buffer, wherein the one or more operations stored in the shadow indirect buffer include the one or more secondary operations; and
   responsive to determining to execute the instructions stored in the indirect buffer, executing the instructions stored in the indirect buffer for rendering the primitives associated with the bin of the plurality of bins and executing the one or more secondary operations stored in the indirect buffer.

2. The method of claim 1, wherein executing the one or more operations stored in the shadow indirect buffer comprises executing only the one or more secondary operations stored in the shadow indirect buffer and not executing the instructions for rendering the primitives.

3. The method of claim 1, further comprising:
   responsive to determining not to execute the instructions stored in the indirect buffer, storing the one or more secondary operations in the shadow indirect buffer.

4. The method of claim 1, wherein determining whether to execute instructions stored in an indirect buffer comprises:
   determining to execute the instructions stored in the indirect buffer if the visibility stream indicates that the bin is associated with the primitives that will be visible in the finally rendered scene.

5. The method of claim 1, wherein determining whether to execute instructions stored in an indirect buffer comprises:
   determining not to execute the instructions stored in the indirect buffer if the visibility stream indicates that the bin is not associated with the primitives that will be visible in the finally rendered scene.

6. The method of claim 1, wherein the primitives comprise triangles.

7. The method of claim 1, wherein the bin represents a tile of a plurality of tiles of the scene, and wherein the primitives associated with the bin are included in the tile for the scene.

8. A device configured for graphics processing comprising:
   a graphics processing unit (GPU) configured to:
      determine, based at least in part on whether a visibility stream indicates that a bin is associated with primitives that will be visible in a finally rendered scene, whether to execute instructions stored in an indirect buffer, wherein the instructions stored in the indirect buffer include instructions for rendering the primitives associated with the bin of a plurality of bins and further include one or more secondary operations;
      responsive to determining not to execute the instructions stored in the indirect buffer, execute one or more operations stored in a shadow indirect buffer, wherein the one or more operations stored in the shadow indirect buffer include the one or more secondary operations; and
      responsive to determining to execute the instructions stored in the indirect buffer, execute the instructions stored in the indirect buffer for rendering the primitives associated with the bin of the plurality of bins and executing the one or more secondary operations stored in the indirect buffer.

9. The device of claim 8, wherein execution of the one or more operations stored in the shadow indirect buffer comprises executing only the one or more secondary operations stored in the shadow indirect buffer, and not executing the instructions for rendering the primitives.

10. The device of claim 8, wherein the GPU is further configured to:
    responsive to determining not to execute the instructions stored in the indirect buffer, store the one or more secondary operations in the shadow indirect buffer.

11. The device of claim 8, wherein responsive to determining to execute instructions stored in an indirect buffer comprises:
    determine to execute the instructions stored in the indirect buffer if the visibility stream indicates that the bin is associated with primitives that will be visible in the finally rendered scene.

12. The device of claim 8, wherein responsive to determining to execute instructions stored in an indirect buffer comprises:
    determine not to execute the instructions stored in the indirect buffer if the visibility stream indicates that the bin is not associated with primitives that will be visible in the finally rendered scene.

13. The device of claim 8, wherein the primitives comprise triangles.

14. The device of claim 8, wherein the bin represents a tile of a plurality of tiles of a scene, and wherein the primitives associated with the bin are included in the tile for the scene.

15. A non-transitory computer-readable storage medium having instructions stored thereon that when executed cause one or more processors to perform operations comprising:
    determining, based at least in part on whether a visibility stream indicates that a bin is associated with primitives that will be visible in a finally rendered scene, whether to execute instructions stored in an indirect buffer, wherein the instructions stored in the indirect buffer include instructions for rendering the primitives associated with the bin of a plurality of bins and further include one or more secondary operations;
    responsive to determining not to execute the instructions stored in the indirect buffer, executing one or more operations stored in a shadow indirect buffer, wherein the one or more operations stored in the shadow indirect buffer include the one or more secondary operations; and
    responsive to determining to execute the instructions stored in the indirect buffer, executing the instructions stored in the indirect buffer for rendering the primitives associated with the bin of the plurality of bins and executing the one or more secondary operations stored in the indirect buffer.

16. The non-transitory computer-readable storage medium of claim 15, wherein executing the one or more operations stored in the shadow indirect buffer comprises executing only the one or more secondary operations stored in the shadow indirect buffer and not executing the instructions for rendering the primitives.

17. The non-transitory computer-readable storage medium of claim 15, wherein the operations further comprise:
responsive to determining not to execute the instructions stored in the indirect buffer, storing the one or more secondary operations in the shadow indirect buffer.

18. The non-transitory computer-readable storage medium of claim 15, wherein determining whether to execute instructions stored in an indirect buffer comprises:
determining to execute the instructions stored in the indirect buffer if the visibility stream indicates that the bin is associated with primitives that will be visible in the finally rendered scene.

19. The non-transitory computer-readable storage medium of claim 15, wherein determining whether to execute instructions stored in an indirect buffer comprises:
determining not to execute the instructions stored in the indirect buffer if the visibility stream indicates that the bin is not associated with primitives that will be visible in the finally rendered scene.

20. The non-transitory computer-readable storage medium of claim 15, wherein the primitives comprise triangles.

21. The non-transitory computer-readable storage medium of claim 15, wherein the bin represents a tile of a plurality of tiles of a scene, and wherein the primitives associated with the bin are included in the tile for the scene.

22. A device comprising:
means for determining, based at least in part on whether a visibility stream indicates that a bin is associated with primitives that will be visible in a finally rendered scene, whether to execute instructions stored in an indirect buffer, wherein the instructions stored in the indirect buffer include instructions for rendering the primitives associated with the bin of a plurality of bins and further include one or more secondary operations;
responsive to determining not to execute the instructions stored in the indirect buffer, means for executing one or more operations stored in a shadow indirect buffer, wherein the one or more operations stored in the shadow indirect buffer include the one or more secondary operations; and
responsive to determining to execute the instructions stored in the indirect buffer, means for executing the instructions stored in the indirect buffer for rendering the primitives associated with the bin of the plurality of bins and executing the one or more secondary operations stored in the indirect buffer.

23. The device of claim 22, wherein means for executing the one or more operations stored in the shadow indirect buffer comprises means for executing only the one or more secondary operations stored in the shadow indirect buffer and means for not executing the instructions for rendering the primitives.

24. The device of claim 22, further comprising:
responsive to determining not to execute the instructions stored in the indirect buffer, means for storing the one or more secondary operations in the shadow indirect buffer.

25. The device of claim 22, wherein the means for determining whether to execute instructions stored in an indirect buffer comprises:
means for determining to execute the instructions stored in the indirect buffer if the visibility stream indicates that the bin is associated with primitives that will be visible in the finally rendered scene.

26. The device of claim 22, wherein the means for determining whether to execute instructions stored in an indirect buffer comprises:
means for determining not to execute the instructions stored in the indirect buffer if the visibility stream indicates that the bin is not associated with primitives that will be visible in the finally rendered scene.

27. The device of claim 22, wherein the primitives comprise triangles.

28. The device of claim 22, wherein the bin represents a tile of a plurality of tiles of a scene, and wherein the primitives associated with the bin are included in the tile for the scene.

* * * * *